(12) United States Patent
Tan et al.

(10) Patent No.: US 9,230,579 B1
(45) Date of Patent: Jan. 5, 2016

(54) COMB GRIPPER FOR USE WITH A SHIPPING COMB AND A RAMP IN THE ASSEMBLY OF A DISK DRIVE

(71) Applicant: Western Digital Technologies, Inc., Irvine, CA (US)

(72) Inventors: Jit Han Tan, Petaling Jaya (MY); Dean Albert Tarrant, Gilroy, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 610 days.

(21) Appl. No.: 13/624,835

(22) Filed: Sep. 21, 2012

(51) Int. Cl.
*G11B 5/48* (2006.01)

(52) U.S. Cl.
CPC ............ *G11B 5/4813* (2013.01); *G11B 5/4806* (2013.01)

(58) Field of Classification Search
CPC .. G11B 5/4806; G11B 5/4826; G11B 5/4813; G11B 5/4833; Y10T 29/49025
USPC ....................................... 29/603.03
See application file for complete search history.

(56) References Cited

U.S. PATENT DOCUMENTS

| | | | |
|---|---|---|---|
| 4,851,943 A * | 7/1989 | Perry ........................ | 360/254.3 |
| 5,482,164 A | 1/1996 | Karns | |
| 5,826,325 A | 10/1998 | Price et al. | |
| 5,984,104 A | 11/1999 | Schott et al. | |
| 6,049,973 A | 4/2000 | Frank, Jr. et al. | |
| 6,344,950 B1 | 2/2002 | Watson et al. | |
| 6,452,753 B1 | 9/2002 | Hiller et al. | |
| 6,467,153 B2 | 10/2002 | Butts et al. | |
| 6,577,473 B1 | 6/2003 | Macpherson et al. | |
| 6,651,192 B1 | 11/2003 | Viglione et al. | |
| 6,657,801 B1 | 12/2003 | Chue et al. | |
| 6,687,093 B1 | 2/2004 | Butler et al. | |
| 6,751,041 B1 | 6/2004 | Codilian et al. | |
| 6,788,480 B1 | 9/2004 | Codilian et al. | |
| 6,791,782 B1 | 9/2004 | Codilian et al. | |
| 6,792,669 B2 | 9/2004 | Codilian | |
| 6,798,592 B1 | 9/2004 | Codilian et al. | |
| 6,862,154 B1 | 3/2005 | Subrahmanyam et al. | |
| 6,894,861 B1 | 5/2005 | Codilian et al. | |
| 6,897,393 B1 | 5/2005 | Codilian et al. | |
| 6,898,044 B1 | 5/2005 | Chheda | |
| 6,941,642 B1 | 9/2005 | Subrahmanyam et al. | |
| 6,943,972 B1 | 9/2005 | Chue et al. | |
| 6,966,107 B2 | 11/2005 | Jones | |
| 7,003,626 B1 | 2/2006 | Chheda et al. | |
| 7,027,242 B1 | 4/2006 | Terrill et al. | |
| 7,046,467 B1 | 5/2006 | Chheda | |
| 7,058,759 B1 | 6/2006 | Reiser et al. | |
| 7,072,129 B1 | 7/2006 | Cullen et al. | |
| 7,076,391 B1 | 7/2006 | Pakzad et al. | |
| 7,076,603 B1 | 7/2006 | Chheda | |
| 7,136,242 B1 | 11/2006 | Chue et al. | |

(Continued)

*Primary Examiner* — Lee D Wilson
*Assistant Examiner* — Tyrone V Hall, Jr.

(57) ABSTRACT

A comb gripper is disclosed for use in the assembly of a disk drive. The comb gripper may be used to push a comb tower of a shipping comb such that a head stack assembly (HSA) of the disk drive is rotated and a head gimbal assembly (HGA) of the disk drive is coupled to a ramp of the disk drive. The comb gripper may comprise: a first gripper finger that includes a protruding portion; a second gripper finger; and an actuator. The actuator may be configured to move the first and second gripper fingers, wherein the actuator is configured to move the protruding portion of the first gripper finger to contact the comb tower and to push the comb tower and the shipping comb such that the HSA is rotated and the HGA is coupled to the ramp.

15 Claims, 7 Drawing Sheets

(56) References Cited

U.S. PATENT DOCUMENTS

| | | |
|---|---|---|
| 7,139,145 B1 | 11/2006 | Archibald et al. |
| 7,145,744 B1 | 12/2006 | Clawson et al. |
| 7,178,432 B1 | 2/2007 | Han et al. |
| 7,193,819 B1 | 3/2007 | Chen et al. |
| 7,199,959 B1 | 4/2007 | Bryant |
| 7,203,020 B1 | 4/2007 | Viglione et al. |
| 7,209,310 B1 | 4/2007 | Tsai et al. |
| 7,222,410 B1 | 5/2007 | Klassen et al. |
| 7,236,911 B1 | 6/2007 | Gough et al. |
| 7,269,525 B1 | 9/2007 | Gough et al. |
| 7,293,351 B2 | 11/2007 | Pfeiffer et al. |
| 7,433,158 B2 | 10/2008 | Koh et al. |
| 7,458,282 B1 | 12/2008 | Wuester, Sr. et al. |
| 7,487,582 B2 | 2/2009 | Ho et al. |
| 7,490,398 B1 | 2/2009 | Klassen et al. |
| 7,506,553 B1 | 3/2009 | Panyavoravaj |
| 7,549,204 B1 | 6/2009 | Vangal-Ramamurthy et al. |
| 7,552,526 B1 * | 6/2009 | Klassen et al. ................... 29/729 |
| 7,559,590 B1 | 7/2009 | Jones |
| 7,561,416 B1 | 7/2009 | Sarraf |
| 7,573,681 B2 | 8/2009 | Lee et al. |
| 7,596,722 B1 | 9/2009 | Pakzad et al. |
| 7,634,375 B1 | 12/2009 | Pakzad et al. |
| 7,653,983 B1 * | 2/2010 | Klassen ...................... 29/603.03 |
| 7,669,711 B1 | 3/2010 | Westwood |
| 7,671,599 B1 | 3/2010 | Tan et al. |
| 7,673,638 B1 | 3/2010 | Boynton et al. |
| 7,690,705 B1 | 4/2010 | Roberts et al. |
| 7,729,802 B2 | 6/2010 | Murray et al. |
| 7,743,486 B1 | 6/2010 | Klassen et al. |
| 7,832,083 B2 | 11/2010 | Son et al. |
| 7,863,889 B1 | 1/2011 | Bamrungtham |
| 7,869,182 B1 | 1/2011 | Tan et al. |
| 7,869,183 B1 | 1/2011 | Tan et al. |
| 7,874,424 B1 | 1/2011 | Westwood |
| 7,896,218 B2 | 3/2011 | Rakpongsiri et al. |
| 7,900,272 B1 | 3/2011 | Tan et al. |
| 7,912,666 B1 | 3/2011 | Pakzad et al. |
| 7,916,599 B1 | 3/2011 | Panyavoravaj et al. |
| 7,921,543 B2 | 4/2011 | Trongjitwikrai et al. |
| 7,940,487 B1 | 5/2011 | Krishnan et al. |
| 7,974,038 B2 | 7/2011 | Krishnan et al. |
| 7,980,159 B1 | 7/2011 | Han |
| 7,987,585 B1 | 8/2011 | Klassen et al. |
| 8,066,171 B1 | 11/2011 | Rakpongsiri et al. |
| 8,078,421 B1 | 12/2011 | Shastry et al. |
| 8,092,610 B1 | 1/2012 | Tarrant |
| 8,094,414 B1 | 1/2012 | Cheng et al. |
| 8,098,460 B1 | 1/2012 | Jen et al. |
| 8,127,643 B1 | 3/2012 | Tan |
| 8,135,208 B1 | 3/2012 | Vangal-Ramamurthy |
| 8,156,633 B1 * | 4/2012 | Foisy ...................... 29/603.03 |
| 8,162,366 B1 | 4/2012 | Tan et al. |
| 8,168,033 B1 | 5/2012 | Mohamad Nor |
| 8,180,487 B1 | 5/2012 | Vangal-Ramamurthy et al. |
| 8,191,233 B2 * | 6/2012 | Naide et al. ................ 29/603.05 |
| 8,199,425 B1 | 6/2012 | Gustafson et al. |
| 8,218,256 B1 | 7/2012 | Lin et al. |
| 8,223,448 B1 | 7/2012 | Haw et al. |
| 8,230,570 B1 | 7/2012 | Choong |
| 8,245,601 B1 | 8/2012 | Hastama et al. |
| 8,248,733 B1 | 8/2012 | Radavicius et al. |
| 8,267,831 B1 | 9/2012 | Olsen et al. |
| 8,270,118 B1 | 9/2012 | Cheng et al. |
| 8,300,338 B1 | 10/2012 | McFadyen |
| 8,307,537 B1 * | 11/2012 | Klassen et al. ............. 29/603.03 |
| 8,312,585 B1 | 11/2012 | Tarrant |
| 8,322,235 B1 | 12/2012 | Keopuang et al. |
| 8,327,529 B1 | 12/2012 | Tan et al. |
| 8,335,049 B1 | 12/2012 | Liu et al. |
| 8,345,367 B1 | 1/2013 | Tharumalingam |
| 8,356,384 B1 | 1/2013 | Ferre et al. |
| 8,369,073 B2 | 2/2013 | Trinh et al. |
| 8,379,363 B1 | 2/2013 | Kolunthavelu et al. |
| 8,387,631 B1 | 3/2013 | Thonghara et al. |
| 8,424,418 B1 | 4/2013 | Wuester, Sr. et al. |
| 8,424,824 B1 | 4/2013 | Tan et al. |
| 8,432,630 B1 | 4/2013 | Lin et al. |
| 8,432,631 B1 | 4/2013 | Lin et al. |
| 8,447,430 B1 | 5/2013 | Tan et al. |
| 8,447,551 B1 | 5/2013 | Ong et al. |
| 8,451,578 B1 | 5/2013 | Tan et al. |
| 8,453,841 B1 | 6/2013 | James et al. |
| 8,454,755 B1 | 6/2013 | Tan et al. |
| 8,485,772 B1 | 7/2013 | Ismail et al. |
| 8,493,681 B1 | 7/2013 | Selvaraj |
| 8,537,480 B1 | 9/2013 | Haw |
| 8,544,164 B1 | 10/2013 | Cheng et al. |
| 8,547,657 B1 | 10/2013 | Liu et al. |
| 8,553,968 B1 | 10/2013 | Lee et al. |
| 8,561,285 B1 | 10/2013 | Vangal-Ramamurthy et al. |
| 8,565,511 B1 | 10/2013 | Sungkhaphong et al. |
| 8,582,229 B1 | 11/2013 | Krishnan |
| 8,596,107 B1 | 12/2013 | Wongdao et al. |
| 8,605,383 B1 | 12/2013 | Wang et al. |
| 8,640,328 B1 | 2/2014 | Yow et al. |
| 8,650,716 B1 | 2/2014 | Methe et al. |
| 8,653,824 B1 | 2/2014 | Liu et al. |
| 8,662,554 B1 | 3/2014 | Srisupun et al. |
| 8,683,676 B1 | 4/2014 | Wuester, Sr. et al. |
| 8,689,433 B1 | 4/2014 | Choong |
| 8,707,531 B1 | 4/2014 | Sungkhaphong et al. |
| 8,713,333 B1 | 4/2014 | Selvaraj |
| 8,763,790 B1 | 7/2014 | Neamsuwan et al. |
| 8,789,446 B1 | 7/2014 | Sungkhaphong et al. |
| 8,811,135 B1 | 8/2014 | Kasino et al. |
| 8,875,386 B1 | 11/2014 | Foisy |
| 2003/0159273 A1 | 8/2003 | Jones |
| 2005/0223547 A1 | 10/2005 | Pfeiffer et al. |
| 2006/0117558 A1 | 6/2006 | Koh et al. |
| 2007/0030599 A1 | 2/2007 | Son |
| 2007/0163105 A1 | 7/2007 | Son et al. |
| 2007/0185616 A1 * | 8/2007 | Murray et al. ................ 700/245 |
| 2008/0084630 A1 | 4/2008 | Trongjitwikrai et al. |
| 2009/0157848 A1 | 6/2009 | Khoo |
| 2010/0108256 A1 | 5/2010 | Roajanasiri et al. |
| 2013/0057986 A1 | 3/2013 | Vangal-Ramamurthy et al. |
| 2013/0248545 A1 | 9/2013 | Thongjitti et al. |

* cited by examiner

COMB GRIPPER FOR USE WITH A SHIPPING COMB AND A RAMP IN THE ASSEMBLY OF A DISK DRIVE

BACKGROUND

A huge market exists for hard disk drives for mass-market computer systems such as servers, desktop computers, laptop computers, and mobile computers (e.g., mobile devices, PDAs, cell phones, etc.). To be competitive in this market, a hard disk drive should be relatively inexpensive, and should accordingly embody a design that is adapted for low-cost mass production. Further, there exists substantial competitive pressure to continually develop hard disk drives that have increasingly higher storage capacity, that provide for faster access to data, and at the same time conform to decreasingly smaller exterior sizes and shapes often referred to as "form factors." Satisfying these competing constraints of low-cost, small size, high capacity, and rapid access requires innovation in each of the numerous components and methods of assembly. Typically, the main assembly components of a hard disk drive are a head disk assembly ("HDA") and a printed circuit board assembly ("PCBA").

The HDA typically includes at least one magnetic disk ("disk"), a spindle motor for rotating the disk, and a head stack assembly ("HSA") that includes a head with at least one transducer for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head toward the disk; and (3) a flex cable assembly that provides an electrical interconnect with minimal constraint on movement. The PCBA typically includes signals for processing signals and controlling operations. Within the HDA, the spindle motor rotates the disk or disks, which are the media to and from which the data signals are transmitted via the head of the HGA. Further, many hard disk drive include more than one disk and there may be multiple HGAs with read/write heads for reading from or writing to each disk surface. A typical disk drive may have an array of HGAs with read/write heads arranged in opposing pairs For disk drive manufacturing, the HSA may be shipped together with a shipping comb that separates and protects the heads of the HGAs prior to the integration of the HSA into the HDA to assemble the disk drive. In the manufacture of a disk drive with a ramp design, the HGAs need to be loaded or merged into a ramp of the disk drive. In particular, the HGAs may include lift tabs that need to be loaded into the ramp and that may be used for sliding on ramp lanes.

One method of loading the lift tabs of the HGAs into the ramp during the disk drive assembly process is by utilizing a comb gripper that rotates the shipping comb and the actuator arms such that the lift tabs and HGAs are loaded into the ramp. However, damage may occur to the HGAs if they are not adequately vertically aligned with the ramp. In particular, collisions may occur between the lift tabs and the HGAs and the ramp during the merge process. For example, the collision may be caused by the lift tab's height traveling lower than it nominal height when the shipping comb first contacts the comb gripper. Existing comb grippers may unfortunately touch the comb tower of the shipping comb at an angle causing angled motion of the shipping comb which results in the tilting of the shipping comp. This tilting may result in the lift tabs and the HGAs being forced downwards such that they may collide with the ramp resulting in a bent lift tab and/or head damage. Unfortunately, once the HGA or lift tab is damaged, the HSA typically needs to be scrapped which may amount to costly yield losses in the disk drive manufacturing process.

DETAILED DESCRIPTION

Figure 1:
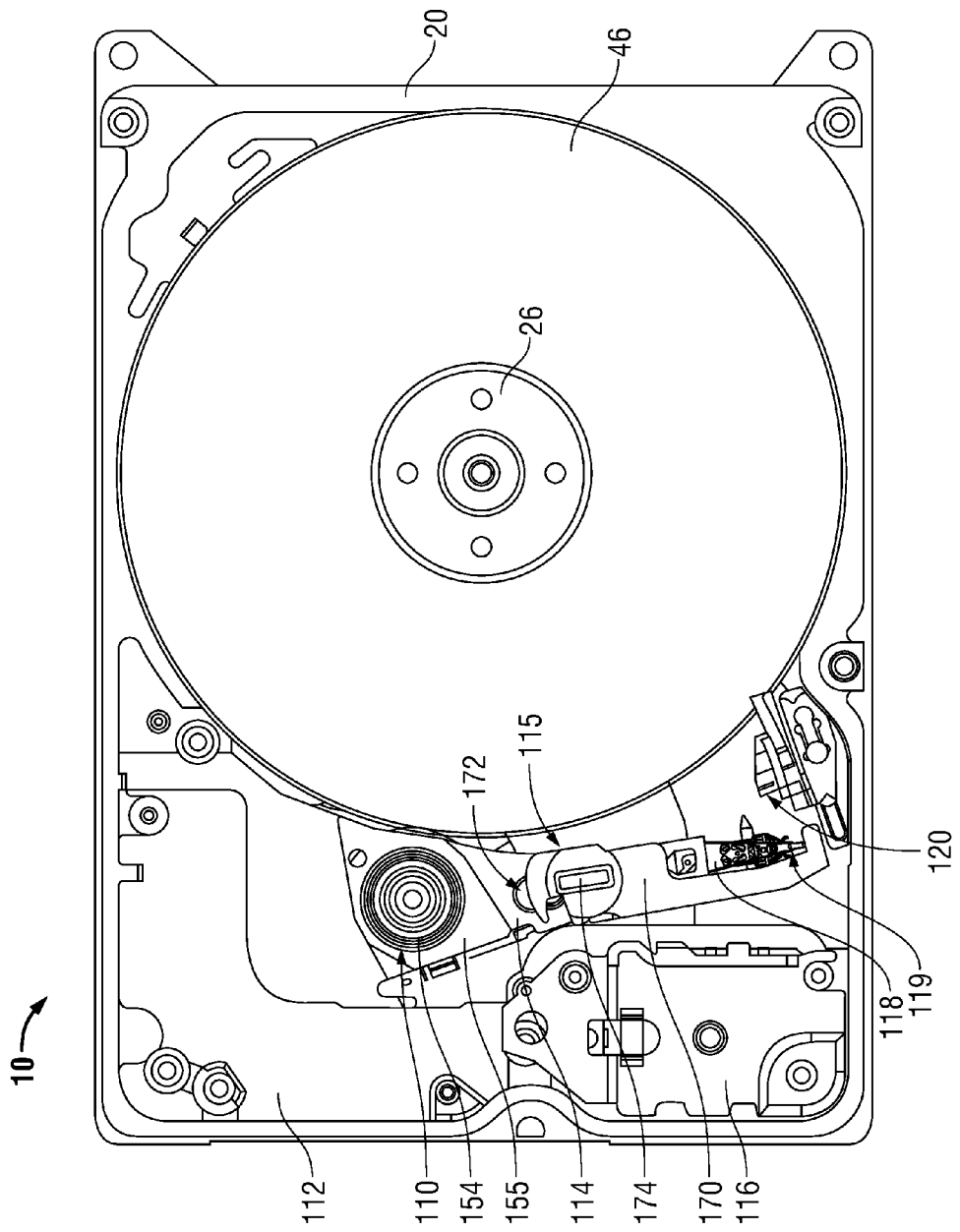
FIG. 1 is a diagram of a hard disk drive with a shipping comb and the cover removed, according to one embodiment of the invention.

FIG. 1 is a schematic diagram of a hard disk drive 10 with the cover removed. FIG. 1 shows the components of the hard disk drive 10 assembled within a base plate 20. Disk drive 10 includes a spindle 26, rotatably mounted on the disk drive base 20, for rotating a disk 46 mounted on the spindle 26. Disk drive 10 may only have a single disk 46 or may have multiple disks. Disk drive 10 may further include a rotary course actuator 110 that is rotatably mounted on the disk drive base 20. The rotary course actuator 110 includes an actuator arm 114 that supports a head gimbal assembly (HGA) 118. Base coil motor 112 rotates the actuator 110 through a limited angular range so that HGA 118 may be desirably positioned relative to one or more tracks of information on the disk 46. Further, in some embodiments, rotary actuator 110 may include a vertical stack of HGAs 118 supported by multiple actuator arms 114 for use with multiple vertically stacked disks 46.

Under non-operating conditions the HGAs 118 may be parked on a ramp 120, for example, to avoid contact with disks 46 when it is not spinning. During disk drive operation, the rotary actuator 110 moves heads of the HGAs 118 over the disks 46. The rotary actuator 110 may be part of a head stack assembly (HSA). Electrical signals to/from HGAs 118 are carried to other drive electronics, in part via a flex cable (not shown) and a flex cable bracket 116. The HSA 115 may comprise the actuator 110, the HGA 118, the flex cable. It should be appreciated that HSAs and rotary actuators are well known in the art, and this is but one example.

Looking at this particular example, rotary actuator 110 includes a body portion 155 having a pivot bore for receipt of a pivot bearing cartridge 154. The actuator arm 114 is cantilevered from the body portion 155 and a coil assembly (not shown) is cantilevered from the body portion 155 at an opposite direction from the actuator arm 114 for use by the voice coil motor 112 that rotates the actuator 110. The actuator arm(s) 114 supports HGAs 118 each of which supports a head for writing and reading data to and from the disks 46, respectively. It should be appreciated that many other types of actuators may be utilized, and this is just one example. Furthermore, this is just one example of a hard disk drive (HDD) 10, and a wide variety of different types of disk drives may be utilized with embodiments of the invention.

As can be seen in FIG. 1, in the manufacturing process, the actuator 110 may be placed into position in the disk drive 10 by an approximately L-shaped shipping comb 170. The shipping comb 170 may be mounted on top of an actuator arm 114 and through opening 172 of the actuator arms 114 to attach to actuator arms 114 and to lower actuator 110 into disk drive 10 for mounting actuator 110 to the base 20 of disk drive 10. Shipping comb 170 may further include a rectangular-shaped comb tower 174 that may be utilized by a comb gripper (to be hereinafter described) to lower shipping comb 170 and actuator 110 into the disk drive 10 and to mount actuator 110 to the base 20 of the disk drive 10, and as will be described in more detail later, to rotate actuator 110 such that the lift tabs 119 of HGAs 118 are transferred to ramp 120 and to then rotate shipping comb 170 away from ramp 120 and to then remove shipping comb 170 from disk drive 10.

The components of the shipping comb 170, ramp 120, and the comb gripper, will be described in more detail in the following paragraphs with reference to the following figures.

Figure 2A:
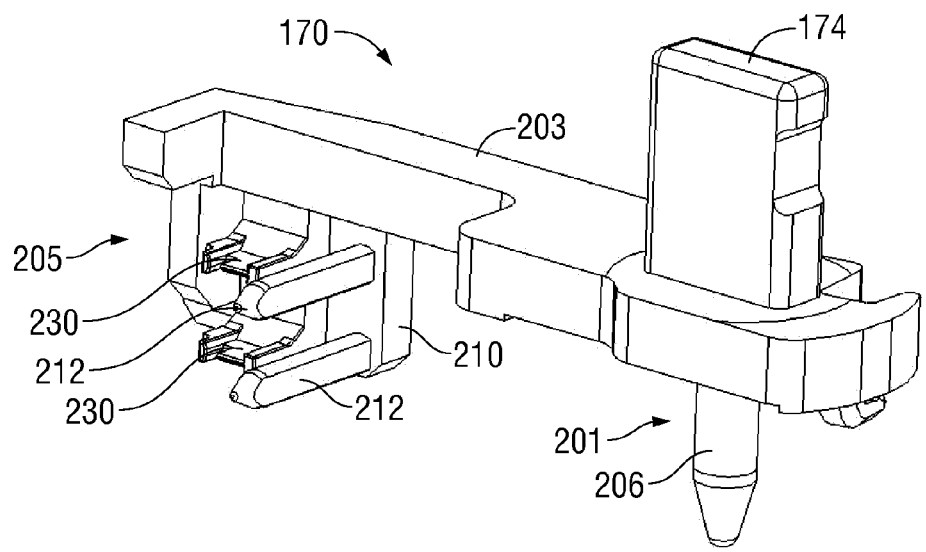
FIG. 2A is a perspective view of the shipping comb, according to one embodiment of the invention.

With additional reference to FIG. 2A, FIG. 2A shows shipping comb 170 which may be approximately L-shaped and may comprise a first section 201, a middle section 203, and a second section 205. First section 201 includes the rectangular-shaped comb tower 174 and a protruding pin 206 that extends through opening 172 of actuator arm 114 for mounting the shipping comb 170 to the actuator 110, as previously described. The second section 205 includes a base portion 210 that includes a plurality of pin-shaped protruding members 212 that extend perpendicularly from base 210 and plurality of bearing members 230 that extend perpendicularly from base 210. The pin-shaped protruding members 212 support the actuator arms 114 and the bearing members 230 support the HGAs 118 and the lift tabs 119 extend beyond the bearing members 230. It should be appreciated that a wide variety of different shapes may be utilized for the shipping comb 170 and these are just examples.

Figure 2B:
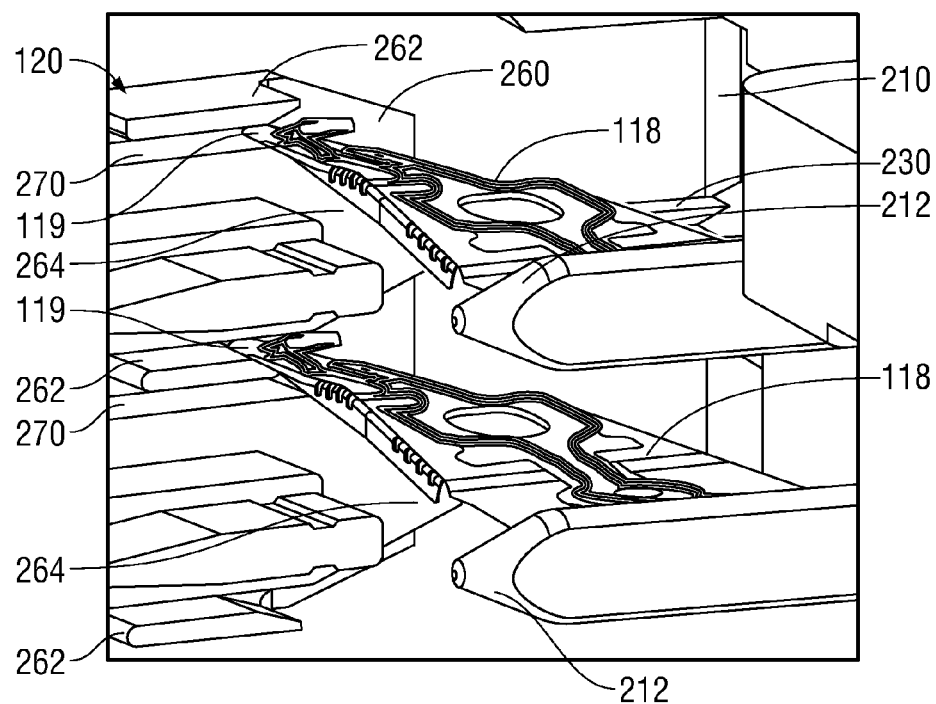
FIG. 2B is a perspective view of the shipping comb and a ramp with an HGA merged thereon, according to one embodiment of the invention.

With additional reference to FIG. 2B, an example of a ramp 120 that receives the lift tabs 119 and the HGAs 118 as part of the merging process is shown. Ramp 120 may include a ramp wall 260 having plurality of ramp garages 262 that extend perpendicularly therefrom. Further, lift tab slides 270 may extend perpendicularly from the ramp wall 260 as part of additional perpendicularly extending ramp sections 264. Additional perpendicularly extending ramp sections may also extend therefrom. For ease of reference in FIG. 2B, FIG. 2B only shows a first lift tab 119 of a first HGA 118 from a top actuator arm being merged beneath a ramp garage 262 such that the lift tab 119 can thereafter slide on the lift tab slide 270 and a second lift tab 119 of a second HGA 118 from the top of a second actuator arm being merged above a ramp garage 262.

Other lift tabs, HGAs, and actuator arms are not shown for ease of reference. It should be appreciated that a multiple number of actuator arms and corresponding HGAs and lift tabs may be utilized with a ramp dependent upon they type of disk drive and the number of disks. The use of ramps to allow for the movement of lift tabs, HGAs, and heads to and from disks is well known in the art.

Figure 3A:
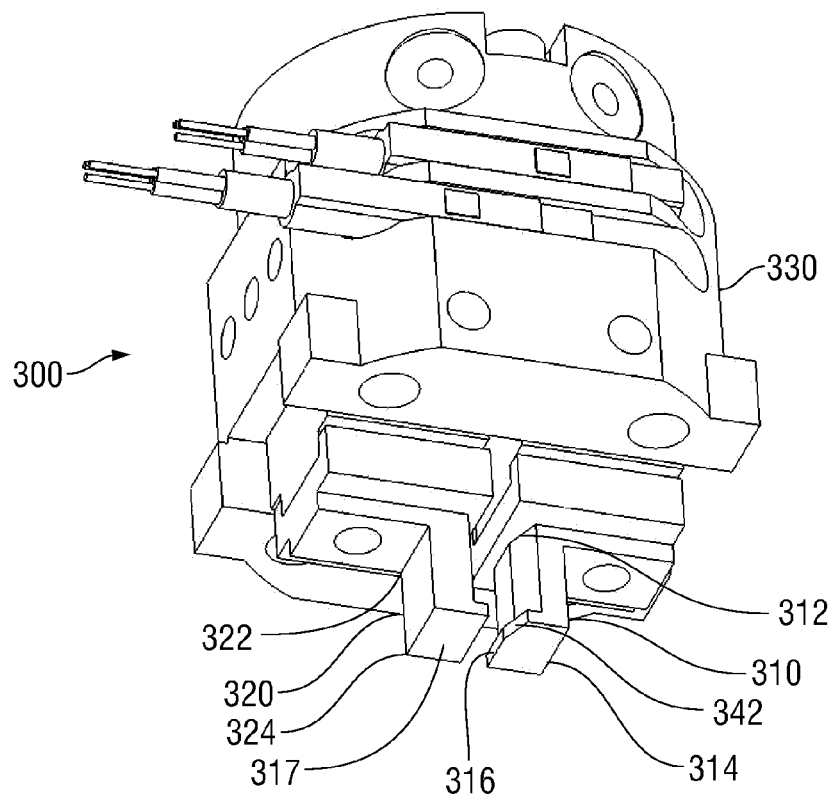
FIG. 3A is a perspective view of a comb gripper including first and second gripper fingers, according to one embodiment of the invention.

With additional reference to FIG. 3A, embodiments of the invention related to a comb gripper 300 will be hereinafter described. Comb gripper 300 may be utilized for pushing the comb tower 174 of shipping comb 170 such that the HSA 115 of the disk drive 10 is rotated and the HGAs 118 of the actuator arms 114 are coupled to ramp 120 during the assembly of the disk drive. The comb gripper 300 may comprise: a first gripper finger 310 having a top end 312 and bottom end 314. The first gripper finger 310 may include a protruding portion 316 at the bottom end 314. Further, comb gripper 300 may include a second gripper finger 320 likewise having a top end 322 and a bottom end 324. The second gripper finger 320 may include a protruding portion 317 at the bottom end 324.

Comb gripper 300 includes an actuator 330 to move the first and second gripper fingers 310 and 320 to grip the comb tower 174 of shipping comb 170 to push the comb tower 174 and the shipping comb 170 such that the HSA 115 is rotated and the HGAs 118 are coupled to the ramp 120. It should be appreciated that actuator 330 may be an electronic actuator, a pneumatic actuator, a liquid based actuator, or any type of suitable actuator known to those skilled in the art. In particular, actuator 330 may be configured to move the protruding portion 316 of the first gripper finger 310 to contact the comb tower 174 and to push the comb tower 174 and the shipping comb 170 such that the HSA is rotated and the HGAs 118 are coupled to the ramp 120.

Figure 3B:
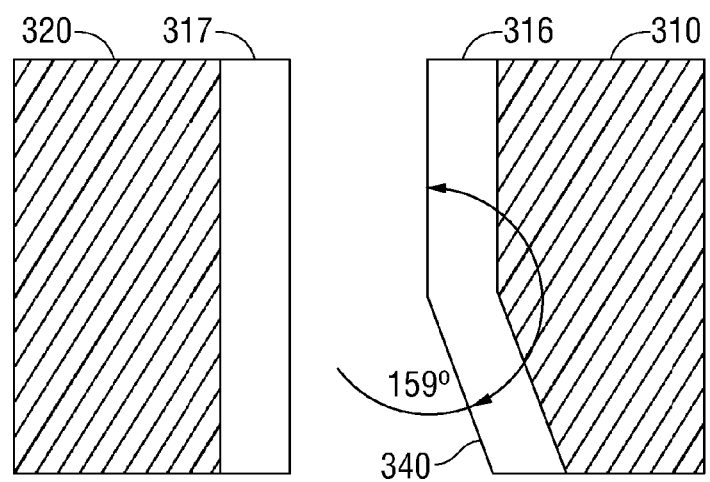
FIG. 3B is a cross-sectional and downward view of the first and second gripper fingers illustrating protruding portions, according to one embodiment of the invention.

With additional reference to FIG. 3B, each of the first and second gripper fingers 310 and 320 is shown to include a protruding portion 316 and 317 at their respective bottom ends. The protruding portion 316 of the first gripper finger 310 includes a protruding portion that includes a chamfered section 340. As an example, the chamfered section 340 may be at an angle of approximately 159°, though other angles are possible in other embodiments. As will be described, chamfered section 340 of the protruding portion 316 of the first gripper finger 310 is configured to include a surface 342 that is parallel to a surface of the comb tower 174 of the shipping comb 170 that it mates with.

As an example, the protruding portion 316 of the first gripper finger 310 may protrude approximately 1 millimeter from the remainder of the first gripper finger 310 and is approximately 1 millimeter thick. Correspondingly, the protruding portion 317 of the second gripper finger 320 may likewise protrude approximately 1 millimeter from the remainder of the second gripper finger 320 and is approximately 1 millimeter thick. Other dimensions are possible in other embodiments.

The first and second gripper fingers 310 and 320 may be formed by milling one millimeter thick material along the inner walls of the first and second gripper fingers 310 and 320 leaving 1 millimeter first and second protruding portions 316 and 317 at their bottom ends. These first and second protruding portions 316 and 317 serve to reduce the contact surface area and bring down the overall contact area between the gripper fingers 310 and 320 and the comb tower 174. The lowering of the contact area between the gripper fingers 310 and 320 and the comb tower 174 reduces comb tilting. Moreover, having the additional modification of the 159° chamfered section 340 of the first gripper finger 310 serves to create a parallel surface contact between the first gripper finger 310 with the comb tower 174 upon initial contact, as will be described, also reducing comb tilting. This type of interaction between the gripper fingers 310 and 320 and the comb tower 174 of the shipping comb 170 will be hereinafter described in more detail.

With additional reference to FIGS. 4A-5C, a description of how utilizing the comb gripper 300 will be described that allows for the merging of the HGAs 118 and lift tabs 119 onto the ramp 120 without comb tilting such that the HGAs and lift tabs are not damaged during merger to the ramp.

Figure 4A:
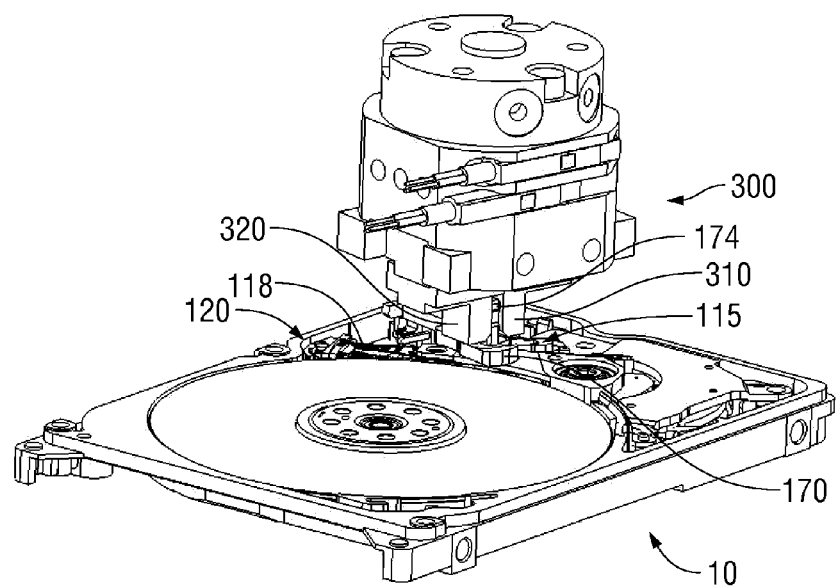
FIG. 4A is a perspective view of the comb gripper initially engaging the shipping comb, according to one embodiment of the invention.
Figure 4B:
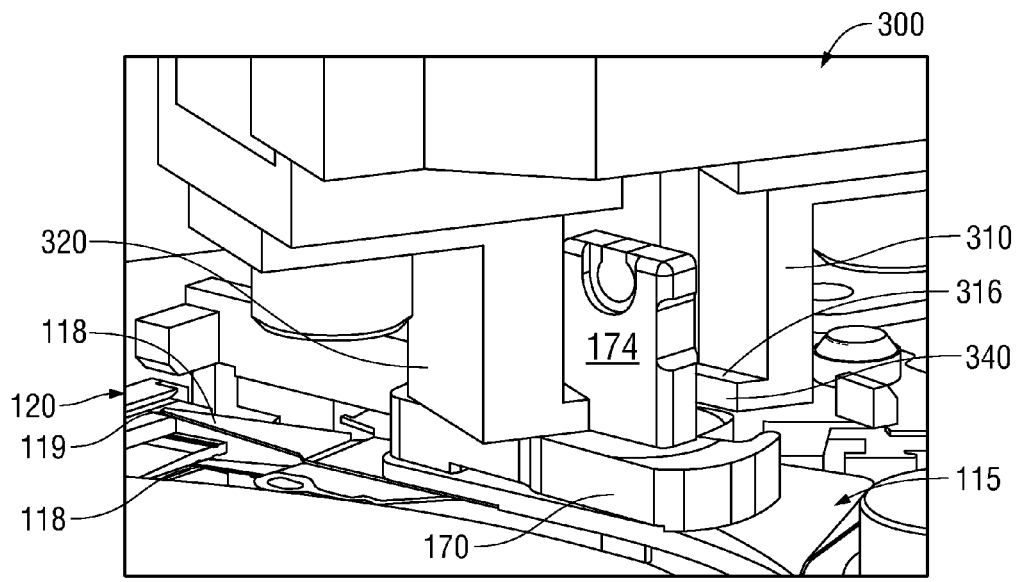
FIG. 4B is a close-up view of the first and second gripper fingers of the comb gripper during the initial engagement with the shipping comb, according to one embodiment of the invention.
Figure 5A:
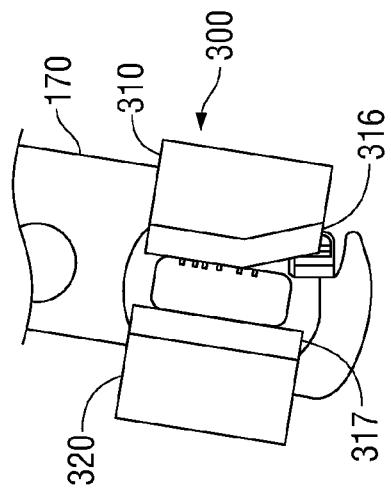
FIGS. 5A-5C illustrate the gripping process by which the gripper fingers of the comb gripper engage the comb tower of the shipping comb, according to one embodiment of the invention.

For example, with particular reference to FIGS. 4A, 4B, and 5A, the comb gripper 300 has been moved down to the comb tower 174 of the shipping comb 170 and initiates the gripping process by moving gripper fingers 310 and 320 towards the comb tower 174 of the shipping comb 170 in disk drive 10. In this first step, the chamfered section 340 of the protruding portion 316 of the first gripper finger 310 initially contacts the comb tower 174 to push the comb tower 174 and the shipping comb 170 such that the HSA 115 is rotated and the HGAs 118 and lift tabs 119 are coupled to the ramp 120. At this point, the second gripper 320 has not yet contacted the comb tower 174.

Figure 4C:
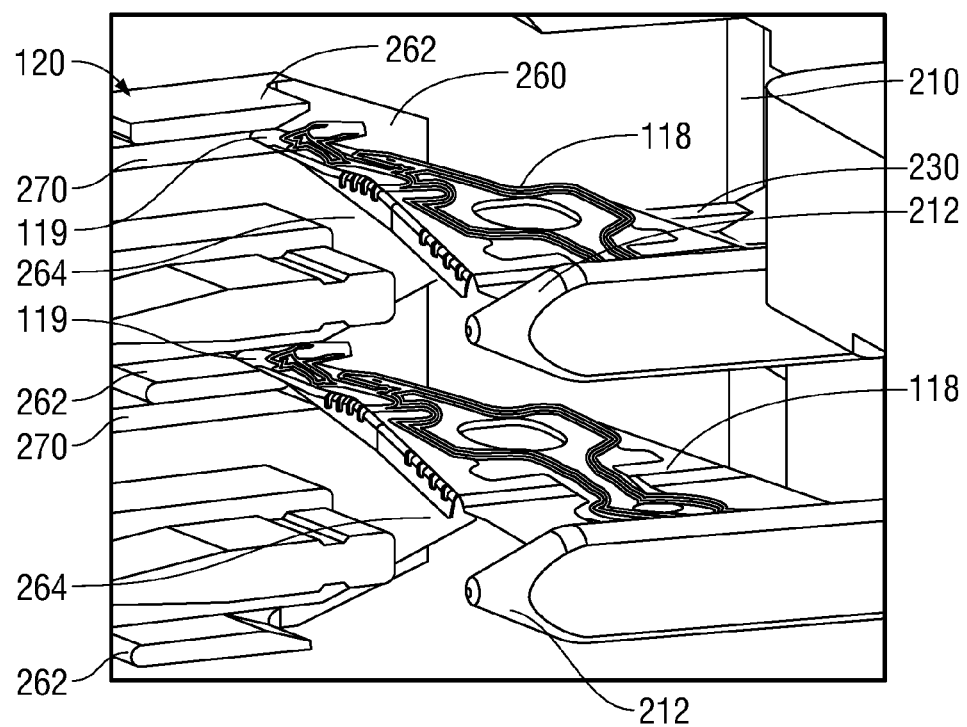
FIG. 4C is a perspective view of the shipping comb and the ramp with the HGA merged thereon, according to one embodiment of the invention.

As can be particularly seen in FIG. 4C, during this first step, the HGAs 118 and lift tabs 119 of the HSA are merged to the ramp 120. At this point, shipping comb 170 has been pushed such that the actuator arms of the HSA are fully engaged with ramp 120 and the HGAs 118 and lift tabs 119 have been merged onto the ramp 120. In particular, the HGAs 118 and lift tabs 119 are loaded onto the ramp 120 without hitting the ramp garages 262 or other areas of the ramp 120. As can be seen in FIG. 4C, a first lift tab 119 of a first HGA 118 associated with a top actuator arm is merged beneath a ramp garage 262 without contacting the ramp garage 262 such that the lift tab 119 can thereafter slide on the lift tab slide 270. Further, a second lift tab 119 of a second HGA 118 from the top of a second actuator arm is merged above a ramp garage 262 without contacting the ramp garage 262 or other areas of the ramp 120.

Thus, comb gripper 300 allows for the merging of the HGAs 118 and lift tabs 119 onto the ramp 120 without comb tilting such that the HGAs and lift tabs are not damaged by hitting the ramp garages 262 or other areas of the ramp 120 during merger to the ramp 120. Further, at this point, the HGAs 118 and lift tabs 119 are fully are engaged and transferred to the ramp 120 such that the heads have been transferred to the disk drive for operation. It should be appreciated that other lift tabs, HGAs, and actuator arms are not shown for ease of reference.

Figure 5B:
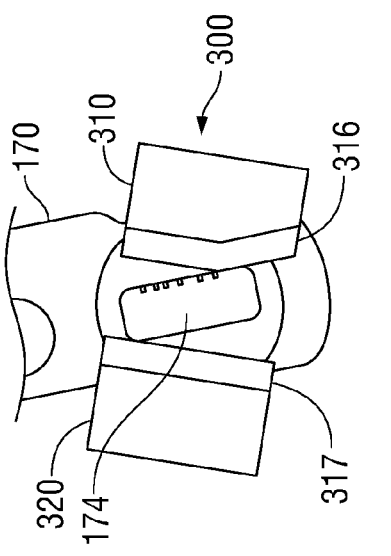

With reference to FIG. 5B, in a second step of the merger process, the second protruding portion 317 of the second finger 320 is pushed by the gripper actuator 300 against the comb tower 174 of the shipping comb 170. In this way, the second protruding portion 317 of the second gripper finger 320 exerts force that is opposite in direction to the force exerted by the first protruding portion 316 of the first gripper finger 310 such that the shipping comb 170 is pushed away from the ramp 120 and the heads of the HGAs 118 and the actuator arms 114 of the HSA 115 loaded thereon.

Figure 5C:
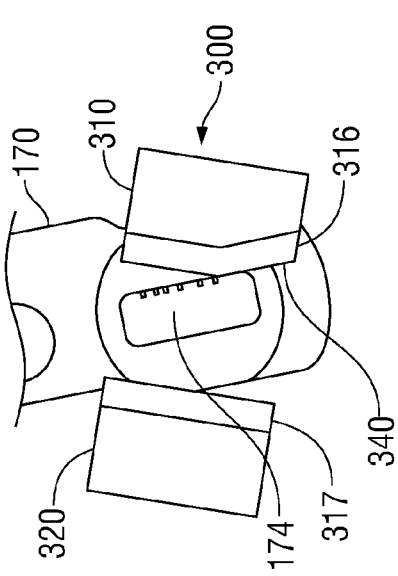

Next, with reference to FIG. 5C, in a third step of the merger process, the second protruding portion 317 of the second finger 320 is moved by the gripper actuator 300 against the comb tower 174 of the shipping comb 170 causing the comb tower 174 and the shipping comb 170 to rotate such that the comb tower 174 is clamped between the first and second protruding portions 316 and 317 of the first and second gripper fingers 310 and 320. At this point, the shipping comb 170 has been completely disengaged from the actuator arms 114 of the HSA 115 and can be removed from the disk drive 10.

Figure 6:
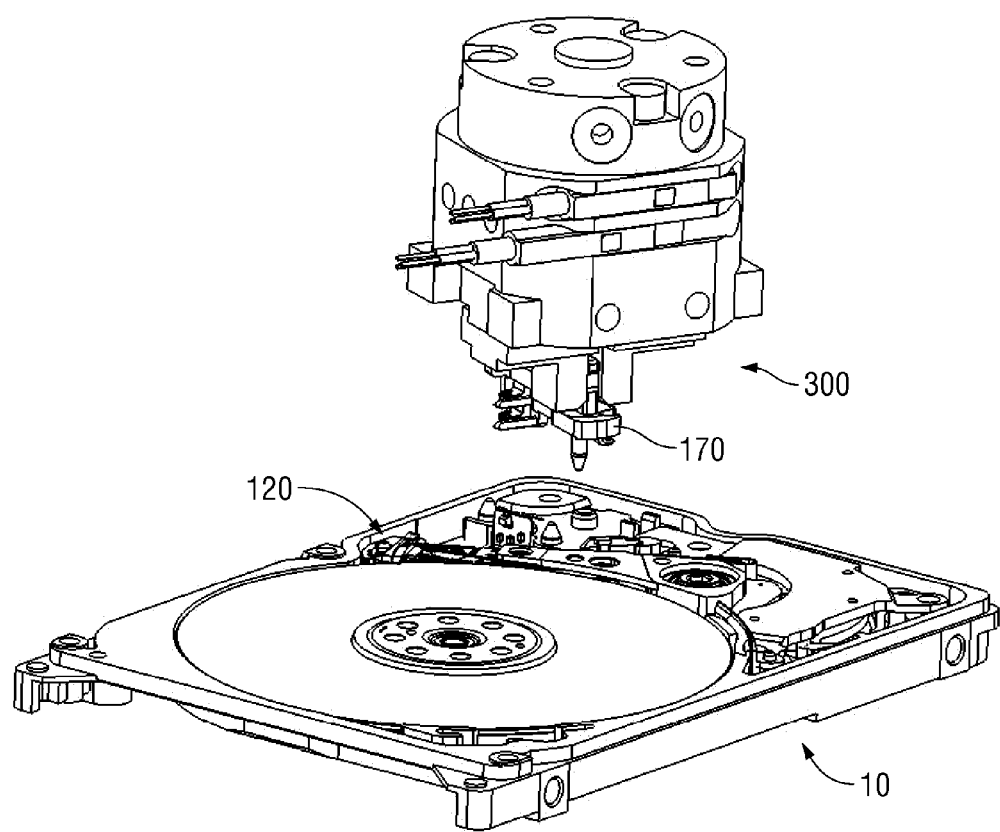
FIG. 6 is a perspective view of the comb gripper removing the shipping comb, according to one embodiment of the invention.

Next, with reference to FIG. 6, shipping comb 170 has been removed from disk drive 10 by comb gripper 300. At this point, the HGAs 118 and lift tabs 119 have been successfully loaded to the ramp 120 of the disk drive 10 and the shipping comb 170 is no longer needed.

Thus, according to the embodiments of the invention, by utilizing the previously-described comb gripper 300 having first and second gripper fingers 310 and 320 that include first and second protruding portions 316 and 317, the overall contact area between the gripper fingers 310 and 320 and the comb tower 174 is reduced during the movement of the shipping comb 170 such that when the shipping comb 170 engages the ramp 120 to transfer the HGAs 118 and the lift tabs 119 onto the ramp 120, comb tilting is reduced or non-existent in the merging process. Thus, the comb gripper 300 allows for the merging of the HGAs 118 and lift tabs 119 onto the ramp 120 with little or non-existent comb tilting such that the HGAs 118 and lift tabs 119 are not damaged during merger to the ramp 120 by crashing into the garage ramps 262 or other portions of the ramp 120. This is advantageous because when the HGAs 118 or the lift tabs 119 are damaged in the merging process during manufacturing, typically the whole head stack assembly (HSA) 115 needs to be completely replaced, and the HSA is typically the most expensive single item of the hard disk drive.

While embodiments of the invention and their various mechanical, electromechanical, electrical components have been described in particular embodiments, it should be appreciated that the embodiments can be implemented with a wide variety of differing mechanical, electromechanical, and electrical components, and combinations thereof. Further, although the previous embodiments have been described as being employed for use with disk drives, these embodiments may be implemented with numerous other types of disk drives or other types of storage devices with similar or other media format characteristics.

What is claimed is:

1. A comb gripper for pushing a comb tower of a shipping comb such that a head stack assembly (HSA) of a disk drive is rotated and at least one head gimbal assembly (HGA) of the disk drive is coupled to a ramp in the assembly of the disk drive, the comb gripper comprising:
   a first gripper finger comprising a top end and a bottom end, the first gripper finger including a protruding portion at the bottom end, wherein the protruding portion of the first gripper finger includes a chamfered section that tapers perpendicular to the first gripper finger;
   a second gripper finger; and
   an actuator configured to move the first and second gripper fingers, wherein the actuator is configured to move the protruding portion of the first gripper finger to contact the comb tower and to push the comb tower and the shipping comb such that the HSA is rotated and the at least one HGA is coupled to the ramp.

2. The comb gripper of claim 1, wherein the chamfered section of the protruding portion of the first gripper finger is configured to include a surface that is parallel to a surface of the comb tower that contacts the surface of the comb tower.

3. The comb gripper of claim 1, wherein the chamfered section of the protruding portion of the first gripper finger contacts the comb tower and pushes the shipping comb causing the at least one HGA to be coupled to the ramp such that a lift tab of the HGA mates to the ramp without contacting a ramp garage.

4. The comb gripper of claim 1, wherein the protruding portion of the first gripper finger protrudes approximately 1 millimeter from a remainder of the first gripper finger and is approximately 1 millimeter thick.

5. The comb gripper of claim 1, wherein the second gripper finger comprises a top end and a bottom end and further comprises a protruding portion at the bottom end.

6. The comb gripper of claim 5, wherein the protruding portion of the second gripper finger protrudes approximately 1 millimeter from a remainder of the second gripper finger and is approximately 1 millimeter thick.

7. The comb gripper of claim 5, wherein the actuator is configured to move the protruding portion of the second gripper finger against the comb tower causing the comb tower to rotate such that the comb tower is clamped between the first and second gripping fingers.

8. A method for pushing a comb tower of a shipping comb such that a head stack assembly (HSA) of a disk drive is rotated and at least one head gimbal assembly (HGA) of the disk drive is coupled to a ramp in the assembly of the disk drive, the method comprising:
   moving a first gripper finger comprising a top end and a bottom end, the first gripper finger including a protruding portion at the bottom end, wherein the protruding portion of the first gripper finger includes a chamfered section that tapers perpendicular to the first gripper finger; and
   moving a second gripper finger;
   wherein the protruding portion of the first gripper finger contacts the comb tower and pushes the comb tower and the shipping comb such that the HSA is rotated and the at least one HGA is coupled to the ramp.

9. The method of claim 8, wherein the chamfered section of the protruding portion of the first gripper finger is configured to include a surface that is parallel to a surface of the comb tower that contacts the surface of the comb tower.

10. The method of claim 9, wherein the at least one HGA includes a lift tab and the ramp includes a ramp garage.

11. The method of claim 10, wherein the chamfered section of the protruding portion of the first gripper finger contacts the comb tower and pushes the shipping comb causing the at least one HGA to be coupled to the ramp such that the lift tab mates to the ramp without contacting the ramp garage.

12. The method of claim 8, wherein the protruding portion of the first gripper finger protrudes approximately 1 millimeter from a remainder of the first gripper finger and is approximately 1 millimeter thick.

13. The method of claim 8, wherein the second gripper finger comprises a top end and a bottom end and further comprises a protruding portion at the bottom end.

14. The method of claim 13, wherein the protruding portion of the second gripper finger protrudes approximately 1 millimeter from a remainder of the second gripper finger and is approximately 1 millimeter thick.

15. The method of claim 14, further comprising moving the protruding portion of the second gripper finger against the comb tower causing the comb tower to rotate such that the comb tower is clamped between the first and second gripping fingers.

* * * * *